(12) United States Patent
Dalton

(10) Patent No.: US 10,655,251 B2
(45) Date of Patent: May 19, 2020

(54) MULTI-LAYER WOVEN TEXTILES FORMED FROM VARIOUS MATERIALS AND TOWELS FORMED FROM MULTI-LAYER WOVEN TEXTILES

(71) Applicant: Homeport Worldwide, LLC, Saratoga Springs, NY (US)

(72) Inventor: Matthew Dalton, Saratoga Springs, NY (US)

(73) Assignee: Homeport Worldwide LLC, Saratoga Springs, NY (US)

( * ) Notice: Subject to any disclaimer, the term of this patent is extended or adjusted under 35 U.S.C. 154(b) by 71 days.

(21) Appl. No.: 15/983,198

(22) Filed: May 18, 2018

(65) Prior Publication Data

US 2019/0257010 A1   Aug. 22, 2019

Related U.S. Application Data

(60) Provisional application No. 62/632,774, filed on Feb. 20, 2018.

(51) Int. Cl.
*D03D 27/08* (2006.01)
*D03D 1/00* (2006.01)
(Continued)

(52) U.S. Cl.
CPC .......... *D03D 27/08* (2013.01); *B32B 5/024* (2013.01); *B32B 5/26* (2013.01); *D03D 1/0017* (2013.01); *B32B 2262/0276* (2013.01); *B32B 2262/062* (2013.01); *D03D 2700/0177* (2013.01); *D03D 2700/50* (2013.01); *D10B 2201/02* (2013.01); *D10B 2331/04* (2013.01)

(58) Field of Classification Search
CPC ...... D03D 27/08; D03D 15/00; D03D 13/008; D03D 15/0061; D03D 27/00; D03D 13/00; D03D 39/22; D10B 2331/04; D10B 2201/02; D10B 2403/0111; A47G 27/0225; A47K 10/02
See application file for complete search history.

(56) References Cited

U.S. PATENT DOCUMENTS

| 384,046 A | * | 6/1888 | Leake | ............ D03D 27/08 139/396 |
| 2,932,327 A | * | 4/1960 | Frauwirth | ............ D03D 27/08 139/396 |

(Continued)

FOREIGN PATENT DOCUMENTS

| CN | 2887909 Y | 4/2007 |
| CN | 105220336 A | 1/2016 |

(Continued)

*Primary Examiner* — Robert H Muromoto, Jr.
(74) *Attorney, Agent, or Firm* — Hoffman Warnick LLC

(57) ABSTRACT

Multi-layer woven textiles may include a first outer layer formed entirely from a cotton material, and a second outer layer positioned opposite the first outer layer. The second outer layer may be formed entirely from the cotton material. Additionally, the woven textiles may include at least one inner layer positioned between the first outer layer and the second outer layer. The at least one inner layer may be formed from the cotton material, and a polyester material. The polyester material may be separated from the cotton material within the at least one inner layer.

13 Claims, 13 Drawing Sheets

(51) Int. Cl.
*B32B 5/02* (2006.01)
*B32B 5/26* (2006.01)
*D03D 15/00* (2006.01)

(56) References Cited

U.S. PATENT DOCUMENTS

| | | | | |
|---|---|---|---|---|
| 3,187,782 A * | 6/1965 | Gattoni | D03D 27/08 | |
| | | | 139/396 | |
| 3,721,272 A * | 3/1973 | Hager | D03D 27/08 | |
| | | | 139/396 | |
| 3,721,273 A * | 3/1973 | Sherrill | D03D 27/08 | |
| | | | 139/396 | |
| 3,721,274 A * | 3/1973 | Sherrill | D03D 27/08 | |
| | | | 139/396 | |
| 4,726,400 A * | 2/1988 | Heiman | D03D 27/08 | |
| | | | 139/396 | |
| 4,984,606 A * | 1/1991 | Moore | D03D 27/08 | |
| | | | 139/25 | |
| 5,027,438 A | 7/1991 | Schwarze et al. | | |
| 5,251,676 A * | 10/1993 | Yeh | D03D 27/00 | |
| | | | 139/391 | |
| 5,486,500 A * | 1/1996 | Kaufman | D06P 5/004 | |
| | | | 428/195.1 | |
| 6,062,272 A * | 5/2000 | Waite | D03D 15/00 | |
| | | | 139/420 A | |
| 6,089,052 A | 7/2000 | Riegger | | |
| 6,546,965 B2 * | 4/2003 | Hamby | D02G 3/346 | |
| | | | 139/1 R | |
| 6,666,234 B2 * | 12/2003 | Hamby | D02G 3/346 | |
| | | | 139/396 | |
| 6,770,581 B1 * | 8/2004 | DeMott | A47G 23/03 | |
| | | | 428/91 | |
| 7,044,173 B2 * | 5/2006 | Silver | A47K 10/02 | |
| | | | 139/391 | |
| 7,673,656 B2 * | 3/2010 | Heiman | D03D 27/08 | |
| | | | 139/391 | |
| 7,937,973 B2 | 5/2011 | Sorensen et al. | | |
| 8,186,390 B2 * | 5/2012 | Krishnaswamy | B32B 5/024 | |
| | | | 139/420 A | |
| 8,267,126 B2 * | 9/2012 | Rabin | D03D 15/00 | |
| | | | 139/383 R | |
| 8,434,333 B2 | 5/2013 | Zhang et al. | | |
| 8,490,657 B2 * | 7/2013 | Rabin | D03D 15/00 | |
| | | | 139/383 R | |
| 8,631,833 B2 * | 1/2014 | Garbarino | D06H 5/00 | |
| | | | 139/383 R | |
| 8,678,044 B2 * | 3/2014 | Rabin | D03D 15/00 | |
| | | | 139/383 R | |
| 9,850,599 B2 * | 12/2017 | Stewart | D03D 27/08 | |
| 10,072,364 B2 * | 9/2018 | Goenka | D03D 15/0027 | |
| 2004/0055659 A1 * | 3/2004 | Silver | A47K 10/02 | |
| | | | 139/396 | |
| 2004/0224121 A1 * | 11/2004 | Sheppard, Jr. | D03D 15/00 | |
| | | | 428/92 | |
| 2005/0081939 A1 * | 4/2005 | Heiman | D03D 27/08 | |
| | | | 139/25 | |
| 2006/0105138 A1 * | 5/2006 | Nichols | A63B 71/00 | |
| | | | 428/102 | |
| 2009/0151105 A1 * | 6/2009 | Bohannon | A45F 5/04 | |
| | | | 15/210.1 | |
| 2009/0176049 A1 * | 7/2009 | Maughn-Haas | A47K 10/02 | |
| | | | 428/76 | |
| 2010/0282359 A1 * | 11/2010 | Rabin | D03D 15/00 | |
| | | | 139/396 | |

FOREIGN PATENT DOCUMENTS

| | | |
|---|---|---|
| CN | 206424027 U | 8/2017 |
| CN | 206528151 U | 9/2017 |
| RU | 2513971 C1 | 4/2014 |

\* cited by examiner

MULTI-LAYER WOVEN TEXTILES FORMED FROM VARIOUS MATERIALS AND TOWELS FORMED FROM MULTI-LAYER WOVEN TEXTILES

CROSS-REFERENCE TO RELATED APPLICATIONS

This application claims the benefit of U.S. Provisional Application Ser. No. 62/632,774, filed Feb. 20, 2018, which is hereby incorporated by reference herein.

BACKGROUND OF THE INVENTION

The disclosure relates generally to woven textiles, and more particularly, to woven textiles having outer layers formed from a first material and an inner layer(s) formed from a combination of the first material and a second material, and towels formed from the woven textiles.

Conventional woven textiles or fabrics are made by continuously weaving a weft thread around a plurality of warp threads (e.g., pile warp thread, ground warp threads). The woven or interlaced weft thread and pile warp threads form the outer layers (e.g., exposed top surface, exposed bottom surface) of the woven textiles. Additionally, the ground warp threads form the inner layer(s) of the woven textiles. The inner layers, commonly referred to as filler material or filler layers, are included within an internal cavity of the woven textiles to provide thickness and/or structure to the woven textiles. In most instances, the inner layers of the woven textiles are not exposed or visible.

These conventional woven textiles are used in a plurality of applications or industries. For example, woven textiles are used in clothing/apparel (e.g., shirts, pants, skirts, etc.), in linens (e.g., towels, bathmats, bed sheets, etc.), in fashion accessories (e.g., bracelets, watch bands, necklaces, etc.), in electronics (e.g., woven conductive layers, protective outer sheath for optical fiber cables), and other various industrial applications (e.g., rope, tape, protective gear, household/kitchenware, etc.). Due to the many uses and applications, conventional woven textiles are manufactured using specific materials and/or manufactured to include specific physical properties. For example, where the woven textiles are used to form towels, it may be desired that the towel be both absorbent, and soft. As a result, conventional woven textiles that form towels are often made solely from cotton material. However, woven textiles formed solely from cotton may retain liquid and/or take longer to dry once the cotton material becomes saturated. To improve absorption and/or drying properties of the woven textiles, conventional towels may be formed from a cotton-polyester blend. This cotton-polyester blend includes both cotton material and polyester material in both the outer layers and the inner layer(s) of the woven textile. While the cotton absorbs the liquid, the polyester may draw, pull, and/or wick the moisture from the cotton to improve dry time and/or increase the amount of liquid the conventional cotton-polyester blend towel can absorb. However, the inclusion of the polyester and reduction in cotton in the woven textiles reduces the softness of the towel.

Additionally, this conventional combination of cotton-polyester blend includes cosmetic issues or problems as well. For example, when attempting to color or dye the cotton-polyester blend woven textile, each material takes or absorbs the dye differently. This results in inconsistencies in the color of the woven textile, which in turn results in the towel having distinct/non-uniform coloration. The non-uniformity in the coloration of the cotton-polyester blend woven textile often makes any product formed from the woven textile less desirable and appealing to consumers.

BRIEF DESCRIPTION OF THE INVENTION

A first aspect of the disclosure provides a woven textile including a first outer layer formed entirely from a cotton material; a second outer layer positioned opposite the first outer layer, the second outer layer formed entirely from the cotton material; and at least one inner layer positioned between the first outer layer and the second outer layer, the at least one inner layer formed from: the cotton material; and a polyester material, the polyester material separated from the cotton material within the at least one inner layer.

A second aspect of the disclosure provides a towel including a first outer layer formed only from a cotton material; a second outer layer positioned opposite the first outer layer, the second outer layer formed only from the cotton material; and at least one inner layer positioned between the first outer layer and the second outer layer, the at least one inner layer formed from: the cotton material; and a polyester material, the polyester material separated from the cotton material within the at least one inner layer.

A third aspect of the disclosure provides a woven textile including a plurality of pile threads forming a first outer layer and a second outer layer, opposite the first outer layer, the plurality of pile treads formed entirely from a cotton material; and a plurality of ground threads distinct from and positioned between the plurality of pile threads, the plurality of ground threads forming at least one inner layer positioned between the first outer layer and the second outer layer, wherein the plurality of ground threads includes: a first edge portion formed entirely from the cotton material; a second edge portion positioned opposite the first edge portion, the second edge portion formed entirely from the cotton material; and a central portion positioned between the first edge portion and the second edge portion, the central portion formed entirely from a polyester material.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As an initial matter, in order to clearly describe the current disclosure it will become necessary to select certain terminology when referring to and describing relevant machine components within the disclosure. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

As indicated above, the disclosure relates generally to woven textiles, and more particularly, to woven textiles having outer layers formed from a first material and an inner layer(s) formed from a combination of the first material and a second material, and towels formed from the woven textiles.

These and other embodiments are discussed below with reference to FIGS. 1-13. However, those skilled in the art will readily appreciate that the detailed description given herein with respect to these Figures is for explanatory purposes only and should not be construed as limiting.

Figure 1:
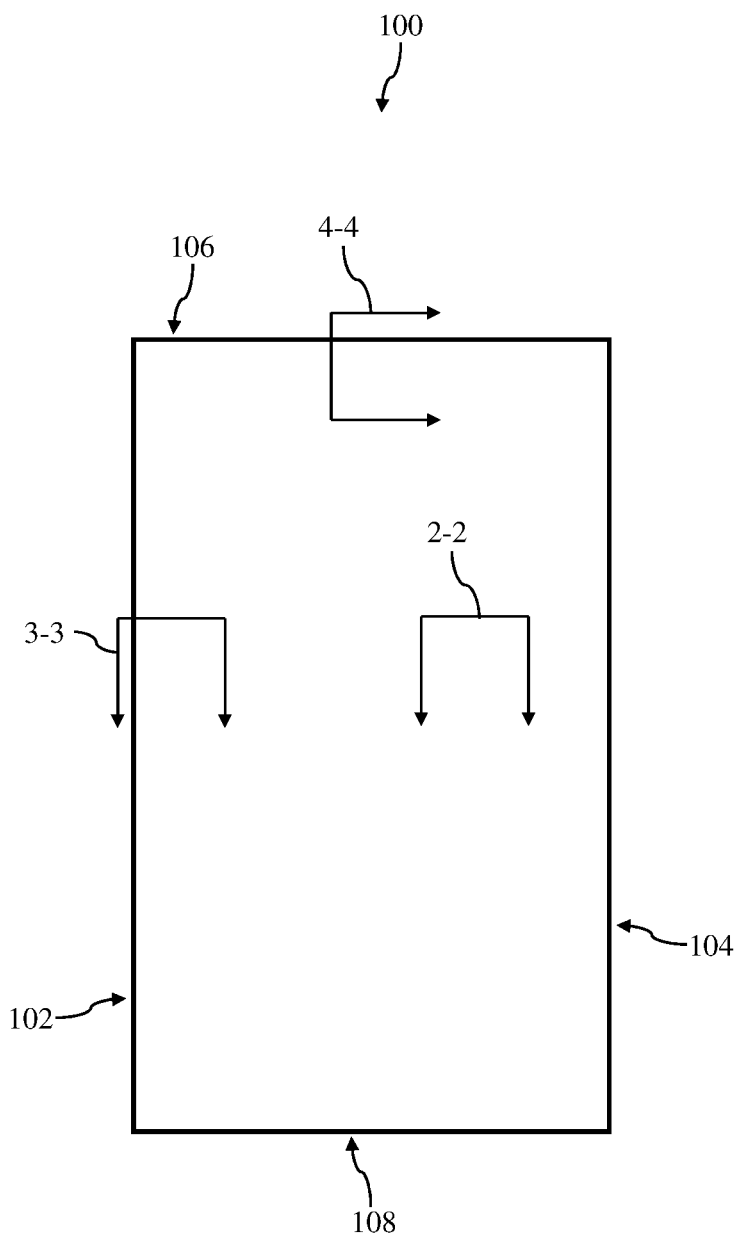
FIG. 1 shows a top view of a towel formed from a multi-layer woven textile, according to embodiments of the disclosure.

FIG. 1 shows a top view of an item formed from a multi-layer woven textile or fabric. In the non-limiting example shown in FIG. 1, the item formed from the multi-layer woven textile (see, FIGS. 6 and 7) may be a towel 100. Towel 100 may include a plurality of edges and ends forming and/or defining the perimeter of towel 100. Specifically, the towel 100 may include a first edge 102 and a second edge 104 positioned opposite first edge 102. Edges 102, 104 may extend over the length of towel 100, and/or between distinct ends 106, 108 of towel 100. That is, towel 100 may also include a first end 106 positioned adjacent to and/or substantially between first edge 102 and second edge 104, and a second end 108 positioned opposite first end 106. Similar to first end 106, second end 108 may be positioned adjacent to and/or substantially between first edge 102 and second edge 104.

Figure 2:
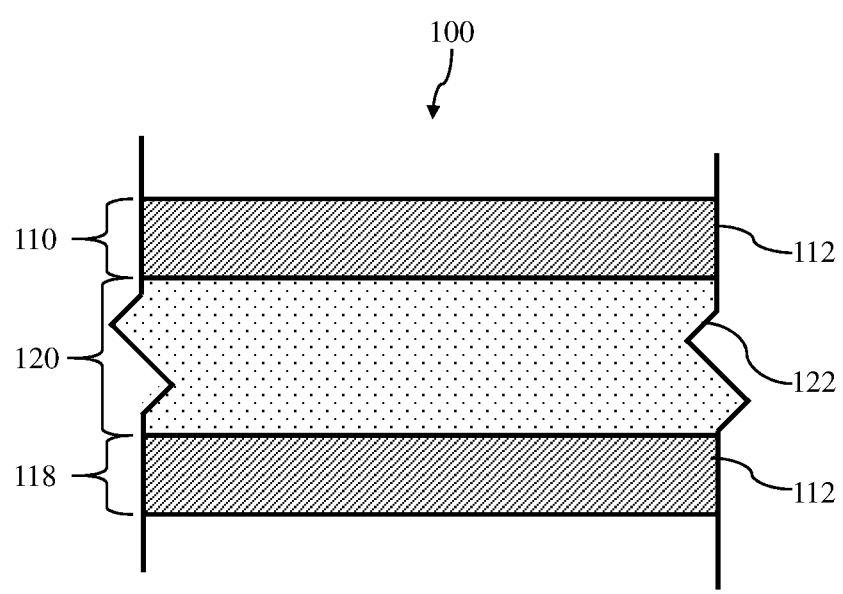
FIG. 2 shows a front cross-sectional view of a portion of the towel of FIG. 1, taken along lines 2-2 in FIG. 1, according to embodiments of the disclosure.
Figure 3:
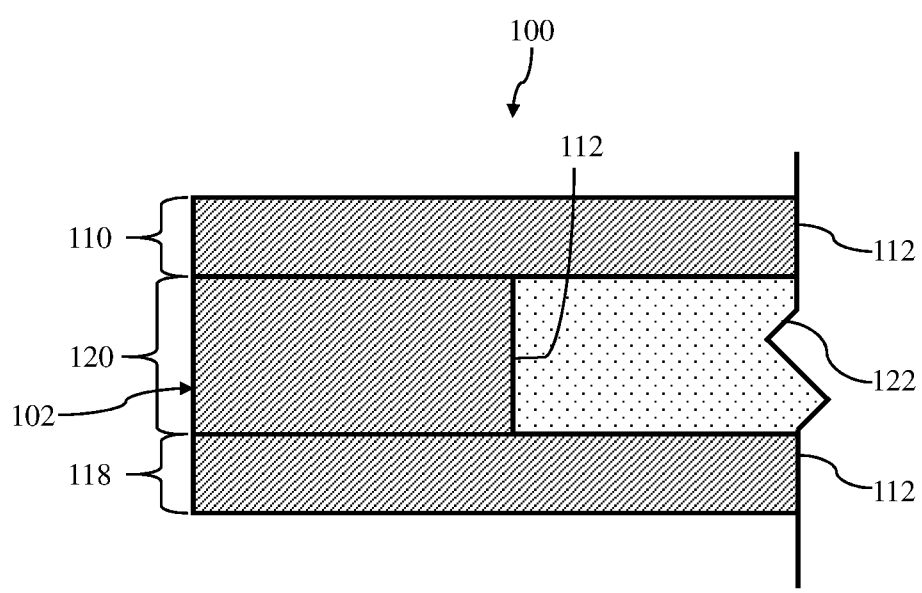
FIG. 3 shows a front cross-sectional view of a portion of the towel of FIG. 1, taken along lines 3-3 in FIG. 1, according to embodiments of the disclosure.
Figure 4:
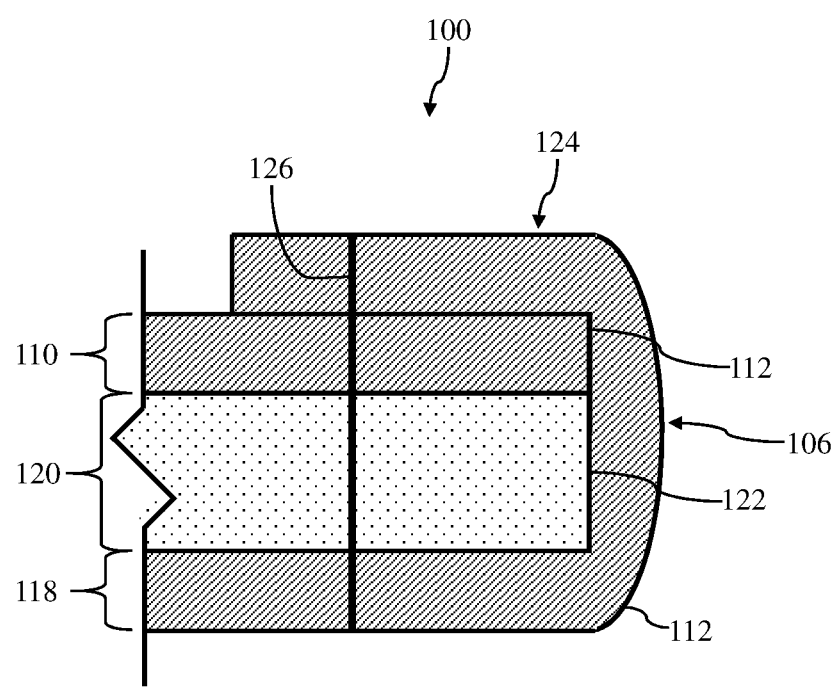
FIG. 4 shows a side cross-sectional view of a portion of the towel of FIG. 1, taken along lines 4-4 in FIG. 1, according to embodiments of the disclosure.

FIGS. 2-4 show various cross-sectional views of towel 100 of FIG. 1. Specifically, FIG. 2 shows a front cross-sectional view of portion of towel 100 between first edge 102 and second edge 104, FIG. 3 shows a front cross-sectional view of a portion of towel 100 including first edge 102, and FIG. 4 shows a side cross-sectional view of a portion of towel 100 including first end 106. It is understood that similarly numbered and/or named components may function in a substantially similar fashion. Redundant explanation of these components has been omitted for clarity.

Turning to FIG. 2, a front cross-sectional view of a portion of towel 100 between first edge 102 and second edge 104 is shown. As discussed herein, towel 100 may be formed from a multi-layer woven textile (see, FIGS. 6 and 7). Each of the multi-layers of the woven textile may include a plurality of warp threads (e.g., pile warp threads, ground warp threads, and so on) and at least one weft thread, as discussed herein. In a non-limiting example, towel 100 formed from the multi-layer woven textile may include a first outer layer 110. First outer layer 110 may form the outer, exposed, and/or top surface of towel 100 that may directly contact an item (e.g., user, floor, table, and the like) utilizing or interacting with towel 100. First outer layer 110 may be formed from a first material 112. That is, and as discussed herein, the entirety of first outer layer 110 may be formed from first material 112. First material 112 may include any suitable material that may be substantially absorbent and/or may include absorption properties. In a non-limiting example, first material 112 may include a cotton material. As discussed herein, first outer layer 110 of towel 100 may be formed from a plurality of pile warp threads and at least one weft thread woven between the plurality of pile warp threads (see, FIGS. 6-9), and the plurality of pile warp threads and/or the weft thread(s) may be formed from cotton material.

As shown in FIG. 2, towel 100 may also include second outer layer 118. Second outer layer 118 may be positioned opposite first outer layer 110. Additionally, second outer layer 118 may form the outer, exposed, and/or bottom surface of towel 100 that may directly contact an item (e.g., user, floor, table, and the like) utilizing or interacting with towel 100. Similar to first outer layer 110, the entirety of second outer layer 118 may be formed from first material 112. First material 112 may include any suitable material that may be substantially absorbent and/or may include absorption properties, for example, cotton material. Also similar to first outer layer 110, and as discussed herein, second outer layer 118 of towel 100 may be formed from the plurality of pile warp threads and at least one weft thread woven between the plurality of pile warp threads (see, FIGS. 6-9).

Towel 100 also include at least one inner layer 120. Inner layer(s) 120 may be positioned between first outer layer 110 and second outer layer 118. That is, inner layer(s) 120 may be substantially covered by, positioned between, and/or surrounded by first outer layer 110 and second outer layer 118. In the non-limiting example, inner layer(s) 120 may not be exposed within towel 100. Specifically, inner layer(s) 120 may not be directly exposed and/or visible through first outer layer 110 and second outer layer 118. As discussed herein, inner layer(s) 120 of towel 100 may be formed from the plurality of ground warp threads and at least one weft thread woven between the plurality of ground warp threads (see, FIGS. 6, 10, and 11). Although a single layer is shown in FIG. 2, it is understood that inner layer(s) 120 of towel 100 may be formed from a plurality of layers.

Distinct from first outer layer 110 and second outer layer 118, inner layer(s) 120 of towel 100 may be formed from a plurality of materials. That is, and with reference to FIGS. 2 and 3, inner layer(s) 120 of towel 100 may be formed from first material 112 (see, FIG. 3), and a second, distinct material 122 (see, FIGS. 2 and 3). As shown, second material 122 of inner layer(s) 120 may be separated from first material 112, such that the materials do not mix, and/or overlap. Additionally, or alternatively, second material 122 of inner layer(s) 120 may not be blended with first material 112 included within inner layer(s) 120, and/or first material 112 and second material 122 forming inner layer(s) 120 may not be a blend of materials and/or be blended materials. As such, second material 122 may be separate from, segregated, and/or isolated from first material 112 when forming inner layer(s) 120. In a non-limiting example shown in FIG. 2, a portion of inner layer(s) 120 positioned between first edge 102 and second edge 104 may be formed from second material 122 that is distinct from first material 112. Turning to FIG. 3, with continued reference to FIG. 2, at least one distinct portion of inner layer(s) 120 positioned directly adjacent first edge 102 and/or second edge 104 (see, FIGS. 10 and 11) may be formed from first material 112, adjacent second material 122. In a non-limiting example discussed herein (see, FIGS. 10 and 11), two edge portions of inner layer(s) 120 may be formed from first material 112, and a central portion of inner layer(s) 120 positioned between the two edge portions may be formed from second material 122. The two edge portions formed from first material 112, and the central portion formed from second material 122 may extend between first end 106 and second end 108 of towel 100.

Second material 122 forming a portion of inner layer(s) 120 may be a distinct material from first material 112. Second material 122 may include any suitable material that may be substantially absorbent and/or may include absorption properties. Additionally, or alternatively, second material 122 may include any suitable material that may include moisture wicking properties. In a non-limiting example, second material 122 may include a polyester material. In the non-limiting example, first material 112 is a cotton material, and second material 122 is a polyester material. As discussed herein, inner layer(s) 120 may not be visible and/or exposed in towel 100. As such, the combination of first material 112 and second material 122 forming inner layer(s) 120 may not be visible and/or exposed in towel 100 and/or through first outer layer 110 and second outer layer 118, respectively. As discussed herein, the combination of first material 112 and second material 122 forming inner layer(s) 120 may not be visible and/or exposed in towel 100 as a result of how edges 102, 104 and/or ends 106, 108 of towel 100 are sealed, finished, and/or formed (see, FIG. 4).

Turning to FIG. 4, a side cross-sectional view of a portion of towel 100 including first end 106 is shown. In the non-limiting example, a section 124 of second outer layer 118 may be positioned on first outer layer 110 to form and/or seal first end 106 of towel 100. Specifically, section 124 of second outer layer 118 may be folded over, positioned on, and/or directly contact first outer layer 110. As shown in FIG. 4, section 124 of second outer layer 118 may wrap around, encompass, and/or surround inner layer(s) 120 of towel 100. In a non-limiting example, first end 106 of towel 100 may be formed and/or sealed by stitching and/or passing a thread 126 through the layers and/or materials of towel 100. That is, thread 126 may pass through section 124 of second outer layer 118, first outer layer 110 positioned below section 124 of second outer layer 118, inner layer(s) 120, and the remaining portion of second outer layer 118, opposite first outer layer 110. In other non-limiting examples, first end 106 of towel 100 may be formed by bonding (e.g., gluing, melting, and the like) the various layers (e.g., first outer layer 110, second outer layer 118) forming towel 100.

Figure 5:
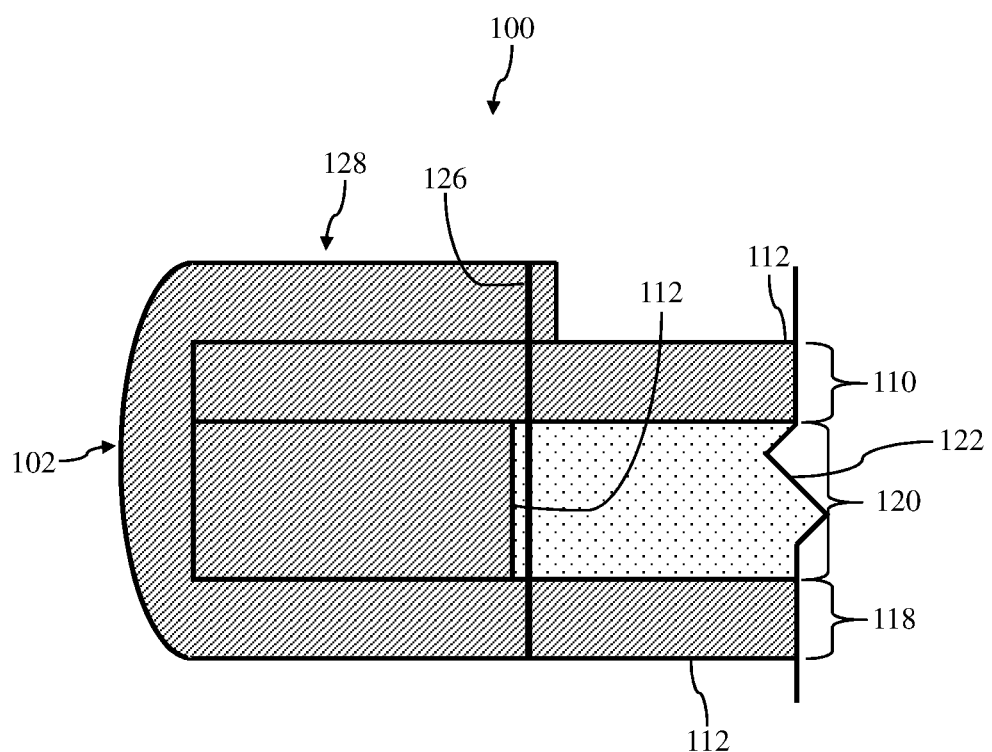
FIG. 5 shows a front cross-sectional view of a portion of the towel of FIG. 1, taken along lines 3-3 in FIG. 1, according to additional embodiments of the disclosure.

Although not shown, it is understood that second end 108 of towel 100 may be sealed, finished, and/or formed in a similar manner as first end 106 of towel 100 discussed herein with respect to FIG. 4. Additionally, it is understood that edges 102, 104 of towel 100 may also be sealed, finished, and/or formed in a similar manner as first end 106 of towel 100 discussed herein with respect to FIG. 4. For example, and as shown in FIG. 5, edge 102 of towel 100 may be sealed, finished, and/or formed such that no portion of inner layer(s) 120 (e.g., edge portion including first material 112, central portion including second material 122) is visible and/or exposed in towel 100 and/or through first outer layer 110 and second outer layer 118, respectively. In the non-limiting example, a section 128 of second outer layer 118 may be positioned on first outer layer 110 to form and/or seal edge 102 of towel 100. Specifically, section 128 of second outer layer 118 may be folded over, positioned on, and/or directly contact first outer layer 110. As shown in FIG. 5, section 128 of second outer layer 118 may wrap around, encompass, and/or surround inner layer(s) 120 of towel 100. Section 128 of second outer layer 118 may also cover and/or be positioned above the edge portion of inner layer 120 formed from second material 122. In the non-limiting example, and similarly disclosed herein with respect to FIG. 4, edge 102 of towel 100 may be formed and/or sealed by stitching and/or passing thread 126 through the layers and/or materials of towel 100. That is, thread 126 may pass through section 128 of second outer layer 118, first outer layer 110 positioned below section 128 of second outer layer 118, inner layer(s) 120, and the remaining portion of second outer layer 118, opposite first outer layer 110. As shown in FIG. 5, thread 126 may pass through the portion of inner layer 120 that is formed from second material 122. In another non-limiting example, thread 126 may pass through the portion of inner layer 120 that is formed from first material 112.

In other non-limiting examples, edges 102, 104 of towel 100 may be formed by bonding (e.g., gluing, melting, and the like) the various layers (e.g., first outer layer 110, second outer layer 118) forming towel 100. Alternatively, edges 102, 104 may be formed and/or sealed by stitching and/or passing thread 126 through the layers 110, 118, 120 and/or materials of towel 100 adjacent edges 102, 104. For example, thread 126 may pass through first outer layer 110, inner layer 120, and second layer 118 adjacent edges 102, 104, respectively. In this example, thread 126 may pass through the portion of inner layer 120 formed from second material 122.

Figure 6:
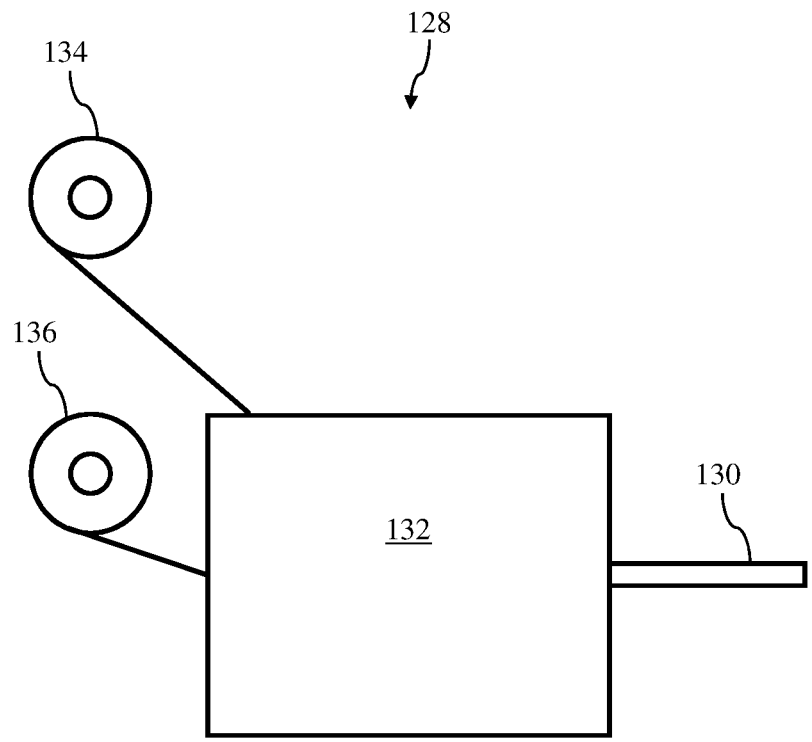
FIG. 6 shows a schematic view of a system forming a multi-layer woven textile from a plurality of pile warp threads and a plurality of ground warp threads, according to embodiments of the disclosure.

FIG. 6 shows a schematic view of a system 128 configured to form multi-layer woven textiles 130 that may form towel 100 (see, FIG. 1). In the non-limiting example shown in FIG. 6, system 128 may include a loom 132 configured to weave a plurality of warp and weft threads to form multi-layer woven textiles 130. The plurality of warp threads may be provided to loom 132 via pile warp threads 134 and ground warp threads 136, respectively, and may be woven with a weft thread(s) (not shown) by loom 132 to form multi-layer woven textiles 130. In a non-limiting example, the plurality of pile warp threads 134 and plurality of ground warp threads 136 may be rolled and/or formed as a spool and feed into loom 132. As discussed herein, the plurality of pile warp threads 134 may be formed from first material 112 (e.g., cotton material) and may be utilized to form outer layers 110, 118 of towel 100. Additionally, the plurality of ground warp threads 136 may be formed in a unique sequence of first material 112 (e.g., cotton material) and second material 122 (e.g., polyester material), and may be utilized to form inner layer(s) 120 of towel 100, as discussed herein.

Figure 7:
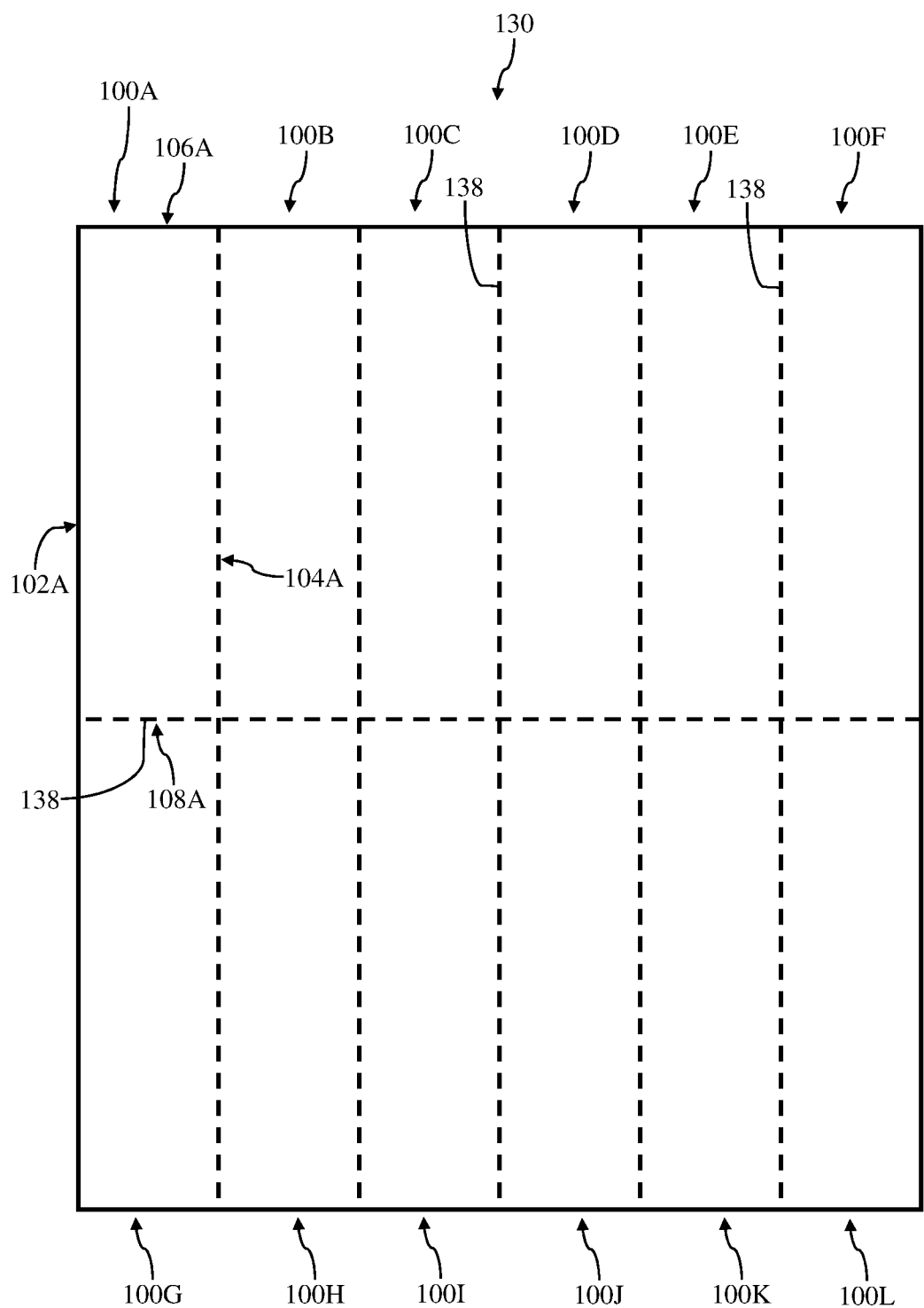
FIG. 7 shows a top view of the multi-layer woven textile formed by the system of FIG. 6, according to embodiments of the disclosure.

FIG. 7 shows a top view of multi-layer woven textile 130 formed by system 128. In the non-limiting example, multi-layer woven textile 130 may form a plurality of towels 100A-100L. Each of the plurality of towels 100A-100L formed from multi-layer woven textile 130 may be substantially similar to towel 100 discussed herein with respect to FIGS. 1-3, and may include similar portions and/or features (e.g., first outer layer 110, second outer layer 118, inner layer(s) 120). Redundant explanation of these components has been omitted for clarity.

Each of the plurality of towels 100A-100L may be formed by cutting and/or separating multi-layer woven textile 130 formed by system 128 (see, FIG. 6). As shown in FIG. 7, multi-layer woven textile 130 may be cut along cut lines 138 to form each of the plurality of towels 100A-100L. In one non-limiting example, system 128 may include a device (not shown) that may cut and/or separate multi-layer woven textile 130 into towels 100A-100L. In another non-limiting example, multi-layer woven textile 130 may be wound around a spool and cut at a later time and/or by a distinct machine or system.

Figure 8:
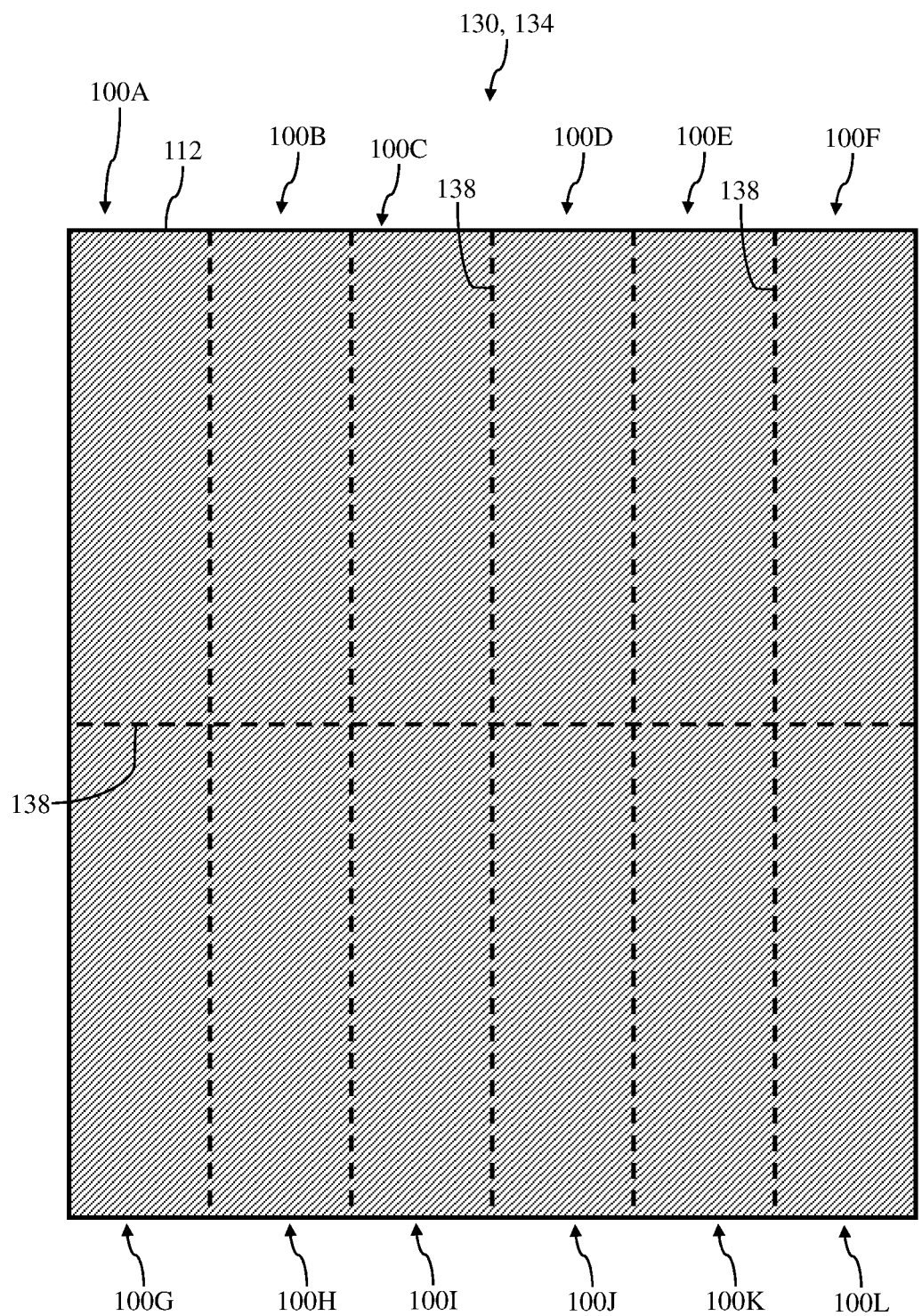
FIG. 8 shows a top view of the plurality of pile warp threads of the system of FIG. 6, according to embodiments of the disclosure.
Figure 9:
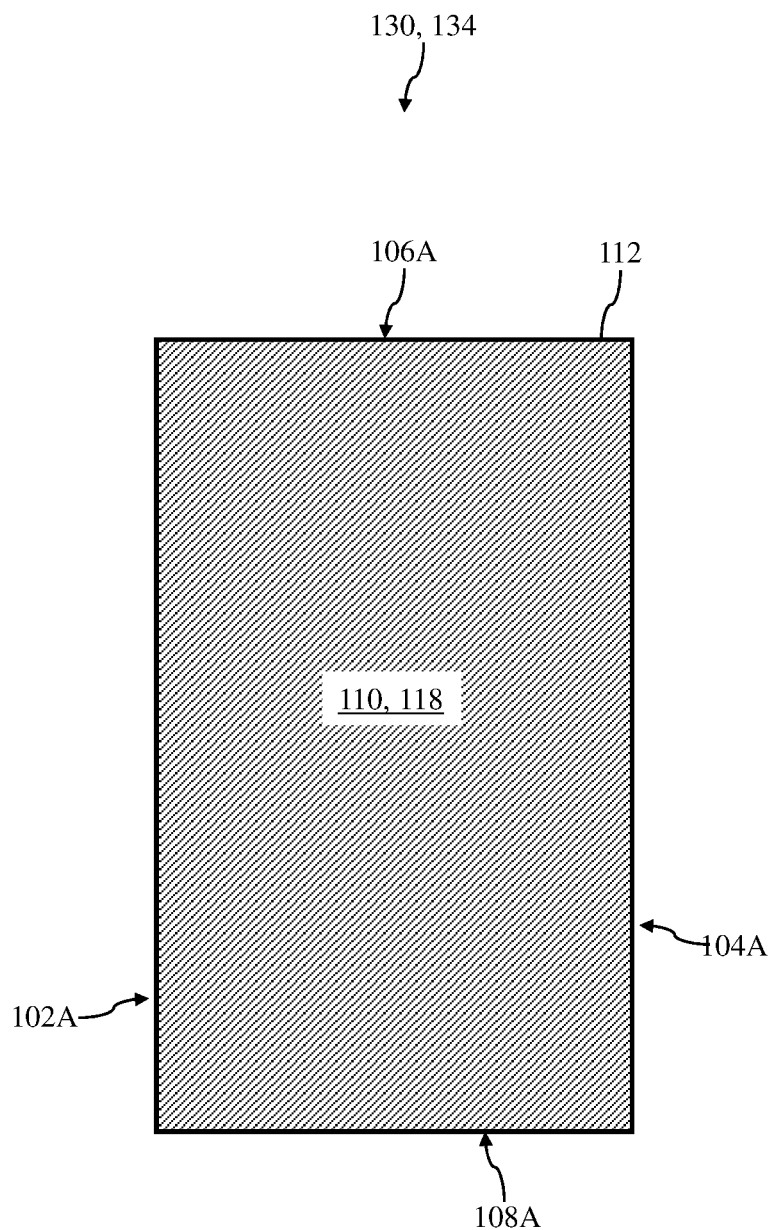
FIG. 9 shows a top view of a portion of the plurality of pile warp threads of FIG. 8, according to embodiments of the disclosure.

FIGS. 8 and 9 show top views of the plurality of pile warp threads 134 utilized by system 128 to form multi-layer woven textile 130. Specifically, FIG. 8 shows a top view of the plurality of pile warp threads 134 forming multi-layer woven textile 130 that may be processed to form towels 100A-100L, and FIG. 9 shows an enlarged top view of a portion of the plurality of pile warp threads 134 forming multi-layer woven textile 130. The portion of the plurality of pile warp threads 134 shown in FIG. 9 may be processed to form a single towel 100 from multi-layer woven textile 130. Although not a cross-section, the top view of the plurality of pile warp threads 134 shown in FIGS. 8 and 9 includes hatching and/or patterning to indicate a sequence and/or placement of first material 112 within the plurality of pile warp threads 134. That is, the plurality of pile warp threads 134 may include and/or be formed only from first material 112 (e.g., cotton material). The plurality of pile warp threads 134 formed only from first material 112 may form first outer layer 110 and second outer layer 118 of each of the plurality of towels 100A-100L, as discussed herein.

Figure 10:
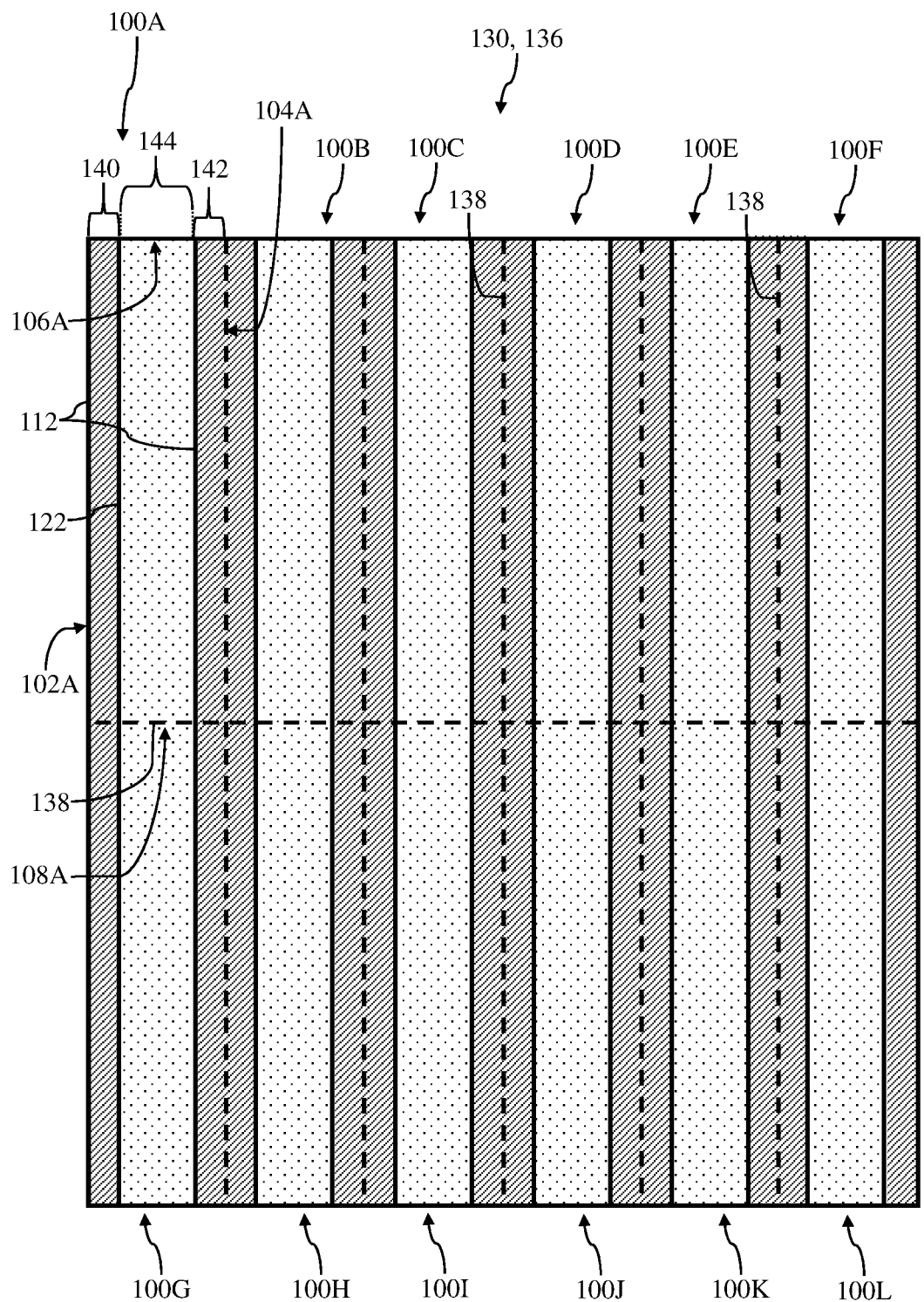
FIG. 10 shows a top view of the plurality of ground warp threads of the system of FIG. 6, according to embodiments of the disclosure.
Figure 11:
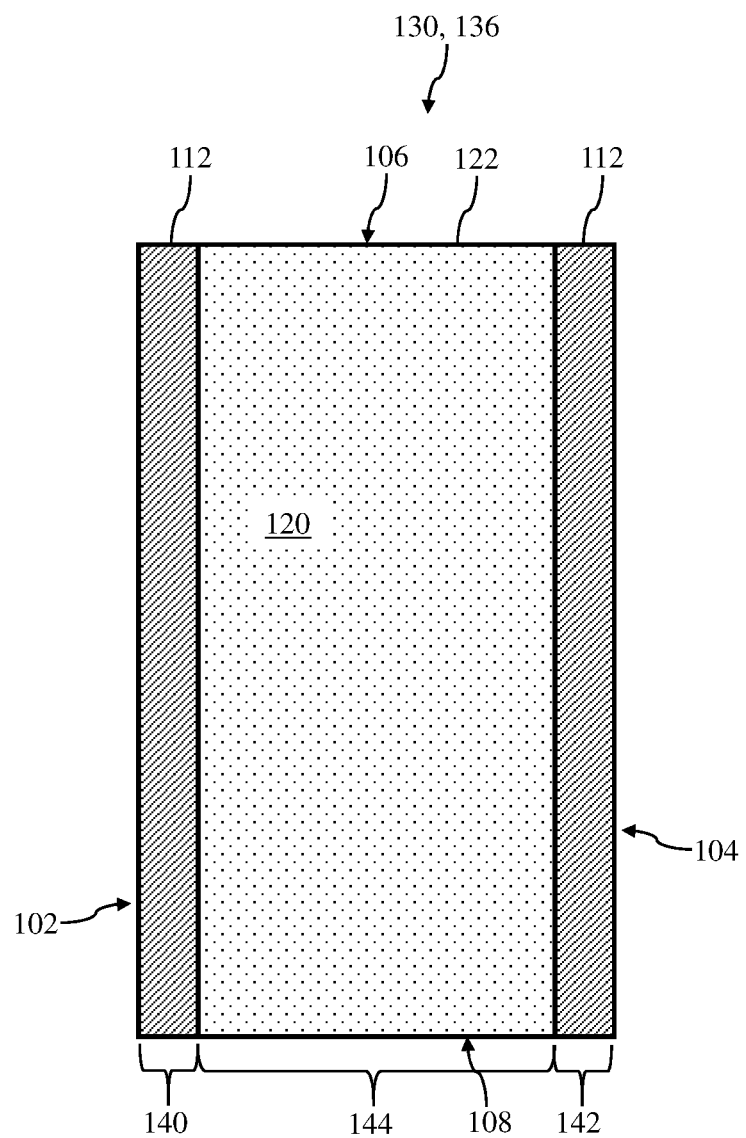
FIG. 11 shows a top view of a portion of the plurality of ground warp threads of FIG. 10, according to embodiments of the disclosure.

FIGS. 10 and 11 show top views of the plurality of ground warp threads 136 utilized by system 128 to form multi-layer woven textile 130. Specifically, FIG. 10 shows a top view of the plurality of ground warp threads 136 forming multi-layer woven textile 130 that may be processed to form towels 100A-100L, and FIG. 11 shows an enlarged top view of a portion of the plurality of ground warp threads 136 forming multi-layer woven textile 130. The portion of the plurality of group warp threads 136 shown in FIG. 11 may be processed to form a single towel 100 from multi-layer woven textile 130. Similar to FIG. 8, although not a cross-section, the top view of the plurality of ground warp threads 136 shown in FIGS. 10 and 11 include hatching and/or patterning to indicate a sequence and/or placement of first material 112 and second material 122 forming the plurality of ground warp threads 136. That is, the plurality of ground warp threads 136 may include and/or be formed from first material 112 (e.g., cotton material) and second material 122 (e.g., polyester material). The plurality of ground warp threads 136 formed from first material 112 and second material 122 may form inner layer(s) 120 of each of the plurality of towels 100A-100L, as discussed herein. As a result of forming inner layer(s) 120, the first material 112 and second material 122 of the plurality of ground warp threads 136 may be arranged in a specific and/or predetermined sequence. For example, and as shown in FIGS. 10 and 11, the first material 112 and second material 122 of the plurality of ground warp threads 136 may be arranged such that each inner layer(s) 120 for each of the plurality of towels 100A-100L formed from multi-layer woven textile 130 includes two distinct edge portions 140, 142, and a central portion 144 positioned between the distinct edge portions 140, 142. Specifically, a first edge portion 140 may be positioned directly adjacent first edge 102A-102L of each towel 100A-100L, a second edge portion 142 positioned directly adjacent second edge 104A-104L of each towel 100A-100L, and central portion 144 positioned between first edge portion 140 and second edge portion 142. Each of first edge portion 140, second edge portion 142 and central portion 144 may also extend between first end 106A-106L and second end 108A-108L for each of the plurality of towels 100A-100L formed from multi-layer woven textile 130.

Additionally, each of the distinct portions 140, 142, 144 of inner layer(s) 120 may be formed from a predetermined material and/or may define the sequence of materials forming the plurality of ground warp threads 136. As such, and as shown in FIGS. 10 and 11, first edge portion 140 and second edge portion 142 may include and/or be formed from first material 112. Also shown in FIGS. 10 and 11, central portion 144 of inner layer(s) 120 for each of the plurality of towels 100A-100L may be formed from and/or may include second material 122. As can be seen in the non-limiting example of FIGS. 10 and 11, inner layer(s) 120 of towels 100A-100L may be formed to include first material 112 and second material 122 based on the specific and/or predetermined sequential arrangement of first material 112 and second material 122 used to form the plurality of ground warp threads 136. As shown, second material 122 included in central portion 144 of inner layer(s) 120 may be separated from first material 112 included in edge portions 140, 142 of inner layer(s) 120, such that the materials do not mix, and/or overlap. Additionally, or alternatively, second material 122 included in central portion 144 of inner layer(s) 120 may not be blended with first material 112 included in edge portions 140, 142 of inner layer(s) 120, and/or first material 112 and second material 122 forming inner layer(s) 120 may not be a blend of materials and/or be blended materials. As such, second material 122 included in central portion 144 of inner layer(s) 120 may be separate from, segregated, and/or isolated from first material 112 included in edge portions 140, 142 of inner layer(s) 120.

Figure 12:
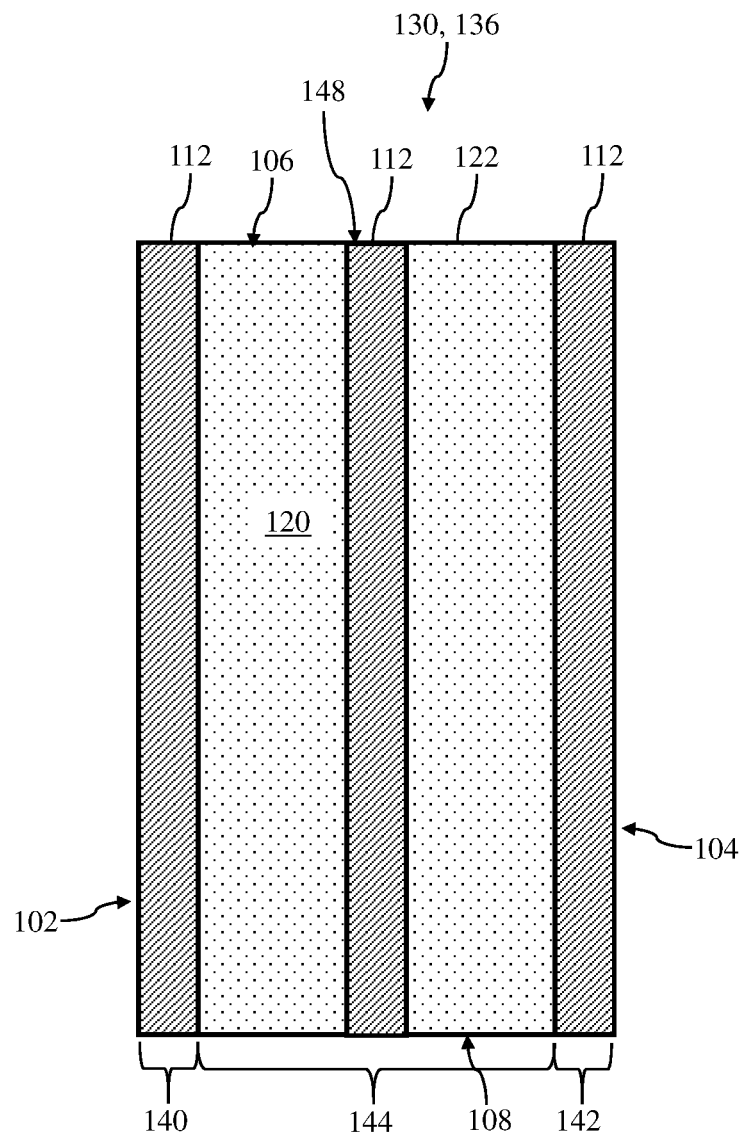
FIG. 12 shows a top view of a portion of the plurality of ground warp threads of FIG. 10, according to additional embodiments of the disclosure.
Figure 13:
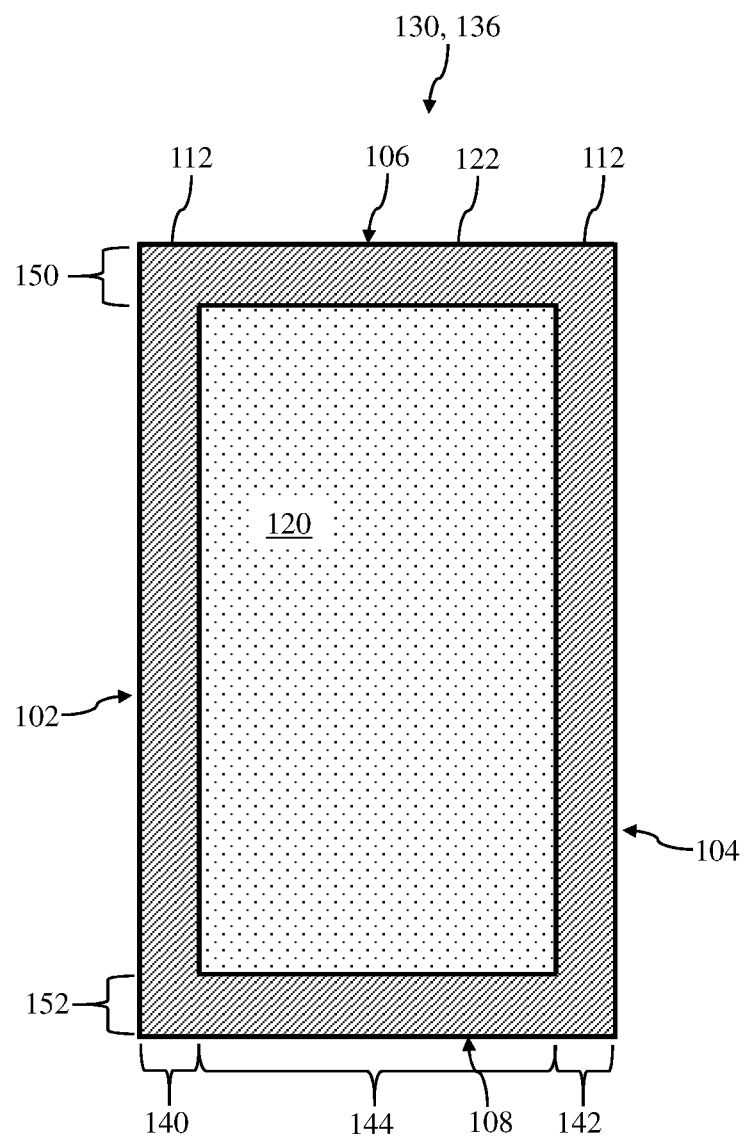
FIG. 13 shows a top view of a portion of the plurality of ground warp threads of FIG. 10, according to further embodiments of the disclosure.

FIGS. 12 and 13 show additional non-limiting examples of inner layer(s) 120 of multi-layer woven textile 130. Specifically, FIGS. 12 and 13 show enlarged top views of a portion of the plurality of ground warp threads 136 forming multi-layer woven textile 130 having unique material sequences and/or shows materials 112, 122 of the plurality of ground warp threads 136 arranged in a specific and/or predetermined sequence. The portion of the plurality of ground warp threads 136 forming multi-layer woven textile 130 shown in FIGS. 12 and 13 may be the plurality of ground warp threads 136 forming inner layer(s) 120 for a single towel 100, as similarly discussed herein with respect to FIGS. 9 and 11. However, it is understood that the plurality of ground warp threads 136 forming multi-layer woven textile 130 may include the features shown in FIGS. 12 and 13 in a unique, specific and/or predetermined sequence or pattern similar to those discussed herein with respect to FIG. 10. It is understood that similarly numbered and/or named components may function in a substantially similar fashion. Redundant explanation of these components has been omitted for clarity.

In the non-limiting example shown in FIG. 12, the plurality of ground warp threads 136 of multi-layer woven textile 130 and/or inner layer(s) 120 of towel 100 may also include at least one segment 148. Segment(s) 148 may be positioned between first edge portion 140 and second edge portion 142 of inner layer(s) 120. Additionally, segment(s) 148 may extend from first end 106 to second end 108. In the non-limiting example, segment(s) 148 may pass through, be included within, and/or may substantially divide central portion 144 of inner layer(s) 120. That is, central portion 144 of inner layer(s) 120 may include segment(s) 148 formed between edge portions 140, 142. As shown in FIG. 12, segment(s) 148 may be formed from first material 112 (e.g., cotton material), similar to edge portions 140, 142 and distinct from central portion 144 formed from second material 122. Although shown substantially in the middle of central portion 144 and/or inner layer(s) 120, it is understood that segment(s) 148 may be positioned anywhere within inner layer(s) 120, so long as segment(s) 148 is positioned between edge portions 140, 142. Additionally in other non-limiting examples segment(s) 148 may not span entirely between ends 106, 108. Finally, although a single segment(s) 148 is shown, it is understood that the number of segment(s) 148 included in inner layer(s) 120 is illustrative, and inner layer(s) 120 may include more or less segments 148 than shown.

As shown in FIG. 13, the plurality of ground warp threads 136 of multi-layer woven textile 130 and/or inner layer(s) 120 of towel 100 may also include at least one end portion 150, 152. Specifically, the plurality of ground warp threads 136 of multi-layer woven textile 130 and/or inner layer(s) 120 of towel 100 may include a first end portion 150 positioned and/or formed adjacent first end 106, and second end portion 152 positioned and/or formed adjacent second end 108, opposite first end portion 152. Each of first end portion 150 and second end portion 152 may extend between first edge portion 140 and second edge portion 142 for each of the plurality of towels 100A-100L formed from multi-layer woven textile 130. Additionally, and as shown in FIG. 13, first end portion 150 and second end portion 152 may be formed from a predetermined material and/or may define the sequence of materials forming the plurality of ground warp threads 136. In the non-limiting example, first end portion 150 and second end portion 152 may include and/or be formed from first material 112 (e.g., cotton material), similar to edge portions 140, 142 and distinct from central portion 144 formed from second material 122.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A woven textile, comprising:
   a first outer layer formed entirely from a cotton material;
   a second outer layer positioned opposite the first outer layer, the second outer layer formed entirely from the cotton material; and
   at least one inner layer positioned between the first outer layer and the second outer layer, the at least one inner layer formed from:
   the cotton material; and
   a polyester material, the polyester material separated from the cotton material within the at least one inner layer,
   wherein the at least one inner layer includes:
   a first edge portion formed from the cotton material,
   a second edge portion positioned opposite the first edge portion, the second edge portion formed from the cotton material, and
   a central portion positioned between the first edge portion and the second edge portion, the central portion formed from the polyester material.

2. The woven textile of claim 1, wherein the central portion of the at least one inner layer includes:

at least one segment extending between the first edge portion and the second edge portion, the at least one segment formed from the cotton material.

3. The woven textile of claim 1, wherein the at least one inner layer includes:
a first end portion formed from the cotton material, the first end portion extending between the first edge portion and the second edge portion; and
a second end portion extending between the first edge portion and the second edge portion, opposite the first end portion, the second end portion formed from the cotton material.

4. The woven textile of claim 1, further comprising:
a first end; and
a second end positioned opposite the first end, each of the first end and the second end including:
a section of the second outer layer positioned on and directly contacting the first outer layer, the section of the second outer layer wrapping around and surrounding the at least one inner layer.

5. The woven textile of claim 1, further comprising:
a first edge; and
a second edge positioned opposite the first edge, each of the first edge and the second edge including:
a section of the second outer layer positioned on and directly contacting the first outer layer, the section of the second outer layer wrapping around and surrounding the at least one inner layer.

6. A towel comprising:
a first edge;
a second edge positioned opposite the first edge;
a first end positioned adjacent and between the first edge and the second edge;
a second end positioned opposite the first end;
a first outer layer extending between the first edge, the second edge, the first end, and the second end, the first outer layer formed only from a cotton material;
a second outer layer positioned opposite the first outer layer and extending between the first edge, the second edge, the first end, and the second end, the second outer layer formed only from the cotton material; and
at least one inner layer positioned between the first outer layer and the second outer layer, the at least one inner layer formed from:
the cotton material; and
a polyester material, the polyester material separated from the cotton material within the at least one inner layer,
wherein the at least one inner layer includes:
a first edge portion positioned directly adjacent the first edge, between the first end and the second end, the first edge portion formed entirely from the cotton material,
a second edge portion positioned directly adjacent the second edge, between the first end and the second end, the second edge portion formed entirely from the cotton material, and
a central portion positioned between the first edge portion and the second edge portion, between the first end and the second end, the central portion formed entirely from the polyester material.

7. The towel of claim 6, wherein the central portion of the at least one inner layer includes:
at least one segment extending between the first edge portion and the second edge portion, the at least one segment formed entirely from the cotton material.

8. The towel of claim 7, wherein the central portion of the at least one inner layer includes:
a first end portion formed entirely from the cotton material, the first end portion extending between the first edge portion and the second edge portion, adjacent the first end; and
a second end portion extending between the first edge portion and the second edge portion, opposite the first end portion and adjacent the second end, the second end portion formed entirely from the cotton material.

9. The towel of claim 6, wherein the first end and the second end each include:
a section of the second outer layer positioned on and directly contacting the first outer layer, the section of the second outer layer wrapping around and surrounding the at least one inner layer.

10. The towel of claim 6, wherein the first edge and the second edge each include:
a section of the second outer layer positioned on and directly contacting the first outer layer, the section of the second outer layer wrapping around and surrounding the at least one inner layer.

11. A woven textile comprising:
a plurality of pile threads forming a first outer layer and a second outer layer, opposite the first outer layer, the plurality of pile treads formed entirely from a cotton material; and
a plurality of ground threads distinct from and positioned between the plurality of pile threads, the plurality of ground threads forming at least one inner layer positioned between the first outer layer and the second outer layer,
wherein the plurality of ground threads includes:
a first edge portion formed entirely from the cotton material;
a second edge portion positioned opposite the first edge portion, the second edge portion formed entirely from the cotton material; and
a central portion positioned between the first edge portion and the second edge portion, the central portion formed entirely from a polyester material.

12. The woven textile of claim 11, wherein the central portion of the plurality of ground threads includes:
at least one segment extending between the first edge portion and the second edge portion, the at least one segment formed entirely from the cotton material.

13. The woven textile of claim 11, wherein plurality of ground threads further comprises:
a first end portion formed entirely from the cotton material, the first end portion extending between the first edge portion and the second edge portion; and
a second end portion extending between the first edge portion and the second edge portion, opposite the first end portion, the second end portion formed entirely from the cotton material.

* * * * *